(12) United States Patent
Ermenko et al.

(10) Patent No.: US 8,561,056 B2
(45) Date of Patent: Oct. 15, 2013

(54) AUTOMATED INSTALLATION OF OPERATING SYSTEMS ON VIRTUAL MACHINES USING CHECKSUMS OF SCREENSHOTS

(75) Inventors: Alexey Ermenko, Netanya (IL); Michael Goldish, Givatayim (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 753 days.

(21) Appl. No.: 12/497,922

(22) Filed: Jul. 6, 2009

(65) Prior Publication Data

US 2011/0004872 A1    Jan. 6, 2011

(51) Int. Cl.
*G06F 9/445* (2006.01)

(52) U.S. Cl.
USPC .......................................... 717/174

(58) Field of Classification Search
USPC .......................................... 717/174
See application file for complete search history.

(56) References Cited

U.S. PATENT DOCUMENTS

| 7,231,606 | B2* | 6/2007 | Miller et al. | 715/738 |
| 2010/0011353 | A1* | 1/2010 | Chalupa et al. | 717/177 |
| 2010/0287455 | A1* | 11/2010 | Tripathi et al. | 714/807 |

* cited by examiner

*Primary Examiner* — Chat Do
*Assistant Examiner* — Chau Nguyen
(74) *Attorney, Agent, or Firm* — Lowenstein Sandler LLP (57) ABSTRACT

A method and a system automatically install a guest operating system on a virtual machine run by a host. In one embodiment, the host includes an installation manager that computes a checksum of a region of an input request image. The installation manager compares the checksum with a stored checksum, and, based on a comparison result of the checksum, automatically determines an input to the input request.

14 Claims, 5 Drawing Sheets

AUTOMATED INSTALLATION OF OPERATING SYSTEMS ON VIRTUAL MACHINES USING CHECKSUMS OF SCREENSHOTS

TECHNICAL FIELD

Embodiments of the present invention relate to virtual machine management, and more specifically, to installation of guest operating systems on virtual machines.

BACKGROUND

A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer.

A host computer can run multiple virtual machines simultaneously. Some of the virtual machines may run the same guest operating system. Conventionally, a system administrator of the host computer manually installs a guest operating system on each virtual machine. Manual installation involves running an installation process that requests a series of manual inputs from the system administrator. To install the same guest operating system on multiple virtual machines, a system administrator typically has to repeatedly enter the same series of manual inputs for each virtual machine. Manual installation can be time-consuming and error prone. Thus, there is a need to improve the conventional installation process.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for automatically installing a guest operating system on a virtual machine run by a host. In one embodiment, the host includes an installation manager that computes a checksum of a region of an input request image. The image shows one input request in an input request series. The input request series is used to gather user inputs for installing the guest operating system. The installation manager compares the checksum of the region with a stored checksum, and, based on a comparison result of the checksum, automatically determines an input to the one input request.

In one embodiment, user interaction with the host during the manual installation of a guest operating system is recorded. The installation manager on the host records installation data in one or more files associated with the guest operating system. In one embodiment, the recorded installation data includes, for each input request, a region of a screenshot selected by the user and the user's response to the input request. A checksum of the selected region is computed for the input request. The checksums and the recorded installation data can be used to automate the installation of the guest operating system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing", "comparing", "determining", "storing", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
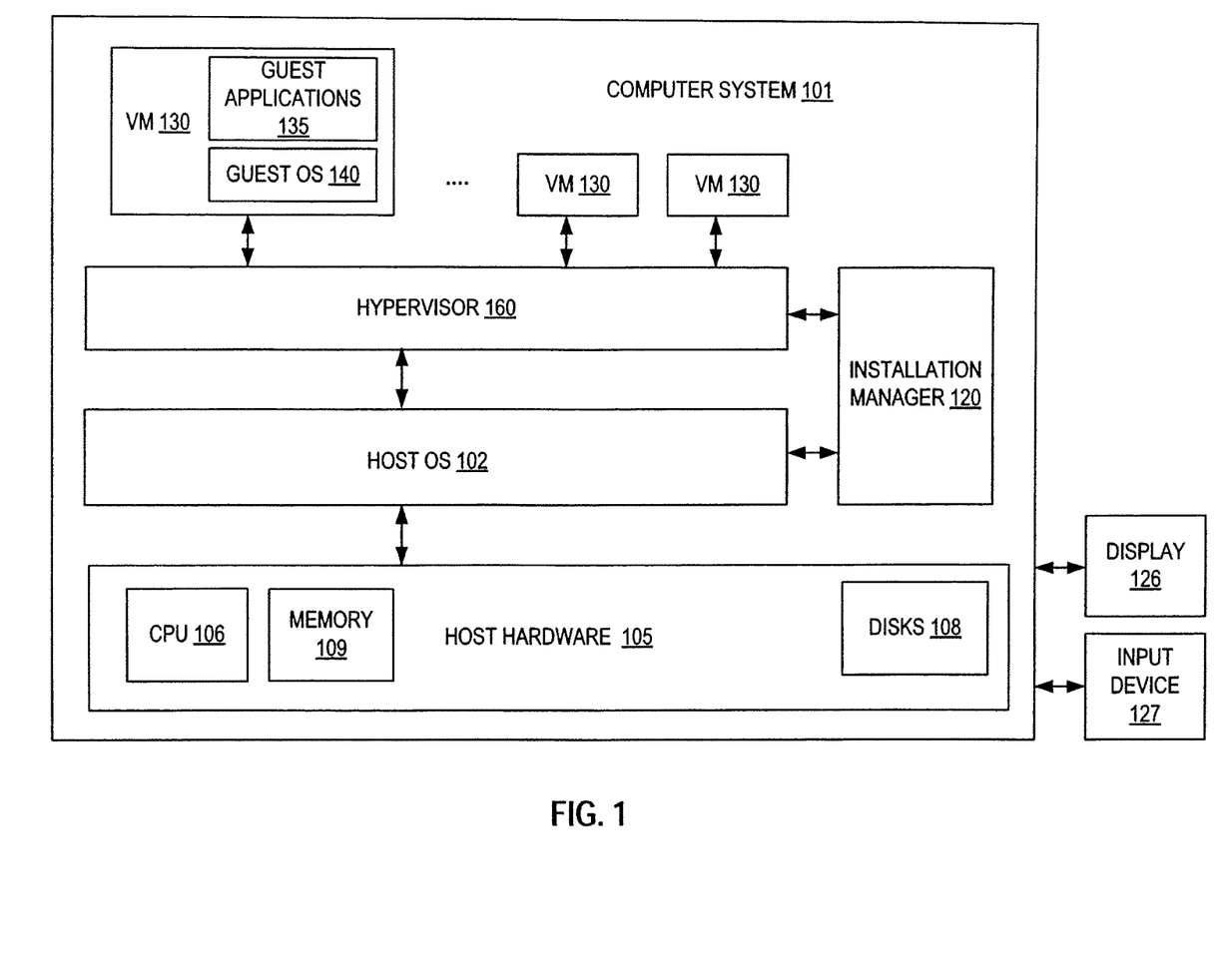
FIG. 1 is a block diagram illustrating one embodiment of a computer system that hosts multiple virtual machines.

FIG. 1 is a block diagram that illustrates an embodiment of a computer system 101 that hosts a plurality of virtual machines (VM) 130. The computer system 101 may include a server machine or a cluster of server machines that run the virtual machines 120. Each virtual machine 130 runs a guest operating system (OS) 140 and one or more guest applications 135. The guest operating systems 140 on the virtual machines 130 may be the same, or different from one another. The guest operating systems 140 may include Microsoft Windows, Linux, Solaris, etc. The computer system 101 may also run a host operating system 102 to manage system resources, including access to memory 109 and disks 108.

Each virtual machine 130 can be accessed by one or more of remote clients over a network (not shown), such as a private network (e.g., a local area network (LAN), wide area network (WAN), intranet, etc.) or a public network (e.g., the Internet). Each virtual machine 130 executes operations for a client. In one scenario, each virtual machine 130 provides a virtual desktop for the client and executes some or all of the graphics operations relating to the virtual desktop. From the user's point of view, the virtual desktop functions as a physical desktop (e.g., a personal computer) and is indistinguishable from a physical desktop.

In one embodiment, the computer system 101 runs a hypervisor 160 to emulate underlying host hardware 105 for the virtual machines 130. The hypervisor 160 may also be known as a virtual machine monitor (VMM) or a kernel-based hypervisor. In some embodiments, the hypervisor 160 may be part of the host operating system 102.

Host hardware 105 includes a central processing unit (CPU) 106, the memory 109, the disks 108 and other hardware components. The memory 109 may include volatile memory devices (e.g., random access memory (RAM)), non-volatile memory devices (e.g., flash memory), and/or other types of memory devices. The computer system 101 also includes a display 126 and one or more input devices 107, such as keyboard and mouse, which are activated by device drivers in the host operating system 102.

According to one embodiment of the present invention, the computer system 101 includes an installation manager 120 that manages the installation of guest operating systems 140 on the virtual machines 130. The installation manager 120 runs an installation process that presents a series of input requests to a user (e.g., a system administrator) on the display 126. The series of input requests can be presented as a series of input request images on the screen. For example, an input request image can be a dialogue box that requests the user to select an option (e.g., "Yes" or "No") or provides a command. According to the user inputs, the installation manager 120 installs a guest operating system 140 on a virtual machine 130. In some embodiments, the installation manager 120 can automate the installation process of installing the guest operating systems 140. The installation manager 120 can record the user inputs during a manual installation, and apply the same inputs during an automated installation. During the automated installation, the installation manager 120 can intercept and redirect the input request images into a file. The installation manager 120 can compare the file and previously-recorded installation data to determine what input is being requested. The installation manager 120 then applies a recorded user input to the corresponding input request. Operations of the installation manager 120 will be described in greater detail with references to FIGS. 2-4.

Figure 2:
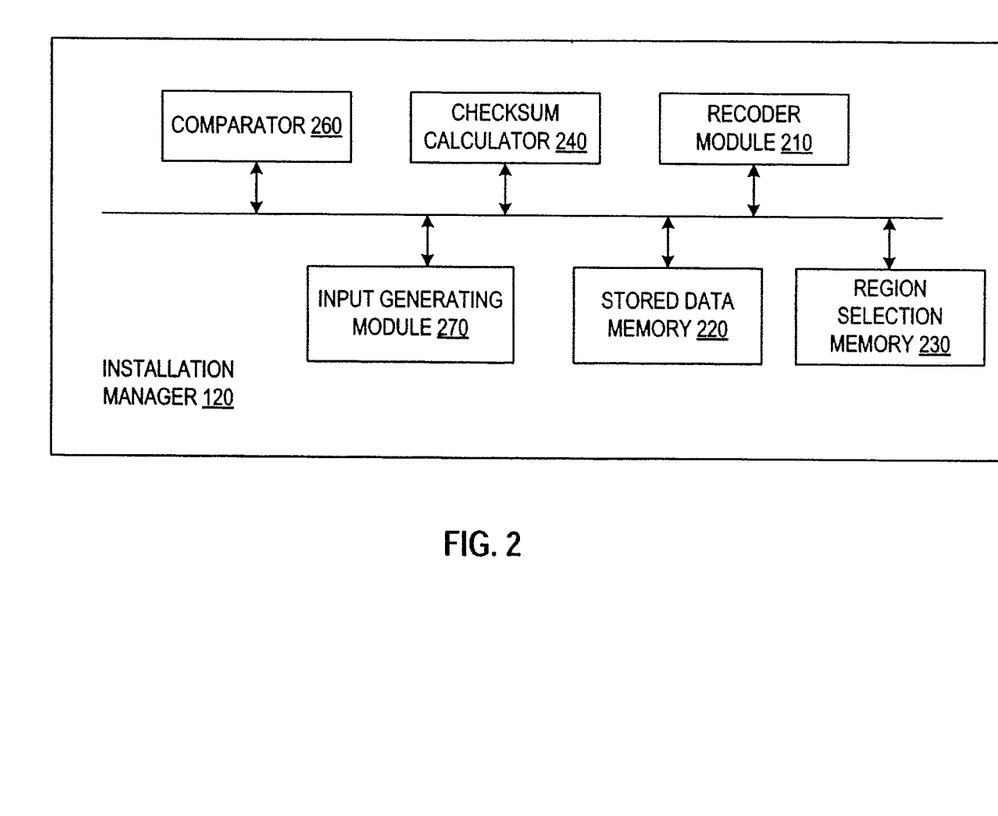
FIG. 2 is a block diagram illustrating one embodiment of an installation manager on the computer system of FIG. 1.

FIG. 2 illustrates an embodiment of the installation manager 120. The installation manager 120 includes a recording module 210 to record user interaction with the computer system 101 during a manual installation. In one embodiment, the recording module 210 records a user's selection of a region on the display screen for each of the input requests presented to the user during the manual installation. The user's selection is stored in a region selection memory 230 in the form of a definition of the selected regions. The definition of the selected regions is specific to the guest operating system to be installed. The definition may include the positions of the regions on the screen, e.g., the coordinates of the pixels that define the region's boundaries. Each region can be selected to contain a feature that identifies a specific input request in the installation process of a specific guest operating system. In one embodiment, the feature can be one or more keywords that identify a specific input request and/or a specific guest operating system. For example, the region may include a dialogue box, or a portion thereof, that contains keywords indicating a request for user input (e.g., "Please specify a directory."). In one embodiment, multiple separate regions of the same screenshot may be selected and recorded. The combination of the separate regions can be used to identify a specific input request associated with a specific guest operating system.

The recorder module 210 also records the user's response to each input request. In one embodiment, the user's response is an input received through the input device 127 of FIG. 1, such as a keyboard, a mouse, or other input mechanism. The recorder module 210 records the user input to each input request in a file associated with the guest operating system. In one embodiment, the user input is stored in a stored data memory 220. The files in the stored data memory 220 do not save graphical data. Instead, only the checksums of the screenshots and the corresponding user inputs are saved.

In one embodiment, the recorder module 210 utilizes a "screen dump" utility provided by the hypervisor 160 to dump the screenshot to a buffer (not shown). A checksum calculator 240 calculates a checksum for the selected region (or regions) from the dumped screenshot, according to the definition of the regions in the region selection memory 230. The checksum may be calculated by a checksum or hash algorithm, such as the Message-Digest algorithm 5 (MD5), which produces a 128-bit value as the checksum. Other checksum algorithms that produce outputs of different lengths may also be used. The checksum for an input request is stored in a data file, with the corresponding user input for the same input request, in the stored data memory 220.

In the embodiment as described above, the data file associated with the manual installation of a guest operating system is constructed by the installation manager 120 of the computer system 101 of FIG. 1. Similarly, in the above embodiment, the definition of the regions stored in the selected region memory 220 is selected by the user of the computer system 101. In an alternative embodiment, the data file and/or the region definition may be constructed by and transported from a different system that is external to the computer system 101. Using the data file and the region definition, the installation manager 120 can automate the installation of the guest operating system.

During an automated installation, the installation manager 120 intercepts and redirects the input request images to a file. The installation manager 120 extracts one or more regions from each input request image according to the region definition stored in the selected region memory 220. The installation manager 120 may use the "screen dump" utility to obtain a screenshot and then extracts one or more regions according to the region definition. The checksum calculator 240 calculates a checksum of the extracted image pixels, and a comparator 260 compares the checksum with the stored checksum, which was computed during the manual installation. A match in the comparison of the checksums means that the current input request is corresponding to a specific installation step of a specific guest operating system. If there is a match in the comparison, an input generating module 270 generates a user input (e.g., a keyboard input signal) based on the user input previously recorded during the manual installation. In one embodiment, the input generating module 270 generates the same user input as the recorded user input for the input request, and sends the user input into the virtual machine on which the guest operating system is to be installed.

The automated installation described above enables a system developer to write complex automated testing and deployment scenarios easily and efficiently. For example, the automated installation can be used to test whether the hypervisor 160, the virtual machines 130, and/or other components of the computer system 101 function properly. The installation manager 120 can be deployed to any computer system that runs one or more virtual machines. A host of multiple virtual machines only needs one installation manager. It is unnecessary for each virtual machine to run an individual installation manager for the purpose of automated installation.

Figure 3:
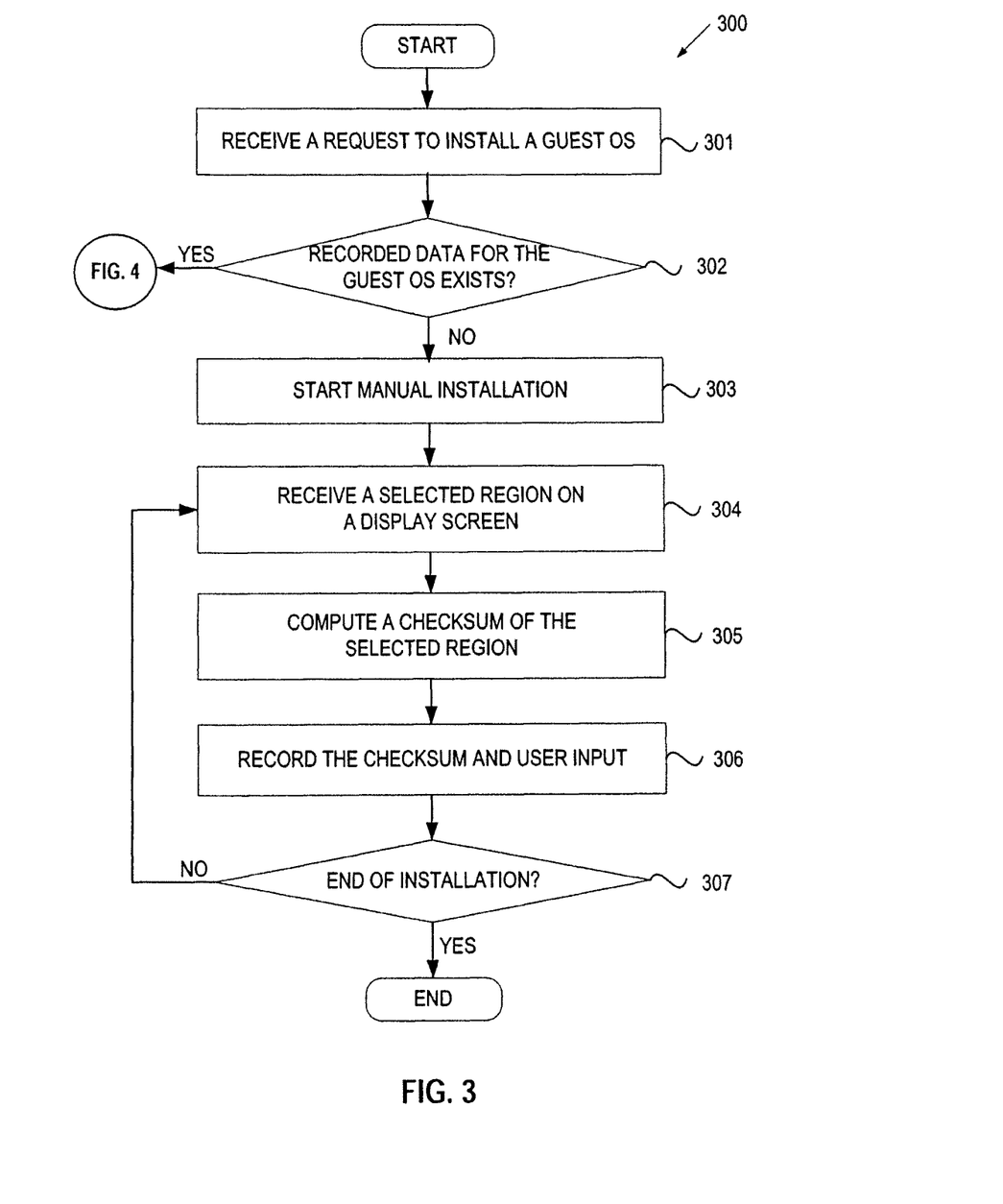
FIG. 3 is a flow diagram illustrating a method for recording manual installation of a guest operating system, in accordance with one embodiment of the present invention.

FIG. 3 is a flow diagram illustrating one embodiment of a method 300 for recording the manual installation of a guest operating system. The method 300 may be performed by processing logic 526 of FIG. 5 that may comprise hardware (e.g., circuitry, dedicated logic, programmable logic, microcode, etc.), software (e.g., instructions on a computer readable storage medium executable by a processing system), or a combination thereof. In one embodiment, the method 300 is performed by the installation manager 120 (FIGS. 1 and 2).

Referring to FIG. 3, in one embodiment, the method 300 begins with the installation manager 120 receiving a request to install a guest operating system on a virtual machine, such as the virtual machine 130 on the computer system 101 of FIG. 1 (block 301). The request may be sent from a system administrator of the computer system 101. The installation manager 120 determines whether recorded data for the guest operating system exists on the computer system 101, e.g., in the stored data memory 220 (block 302). The recorded data may exist if a copy of the same guest operating system has been manually installed on the computer system 101, and the manual installation data (e.g., the checksum of a region of the screenshot and the corresponding user input) has been recorded. The recorded data may also exist if the data has been previously recorded by an external system and transported to the computer system 101 from the external system. If the recorded data does not exist (block 302), the installation manager 120 starts a manual installation (block 303). A series of input requests is presented to the user on the display screen to receive user inputs. For each input request, a screenshot can be taken using a "screen dump" utility. The installation manager 120 receives a user's selection of a region on the display screen (block 304) and stores a definition of the region in the region selection memory 220 according to the selection. The installation manager 120 then extracts the region from the screenshot, and computes the checksum of the pixel values in the region (block 305). After the checksum is computed for an input request, the installation manager 120 records the corresponding user input that is responsive to the input request (block 306). If there are more input requests in the installation process (block 307), the operations in blocks 304-306 are repeated until the end of the installation process is reached. The method 300 then terminates.

Figure 4:
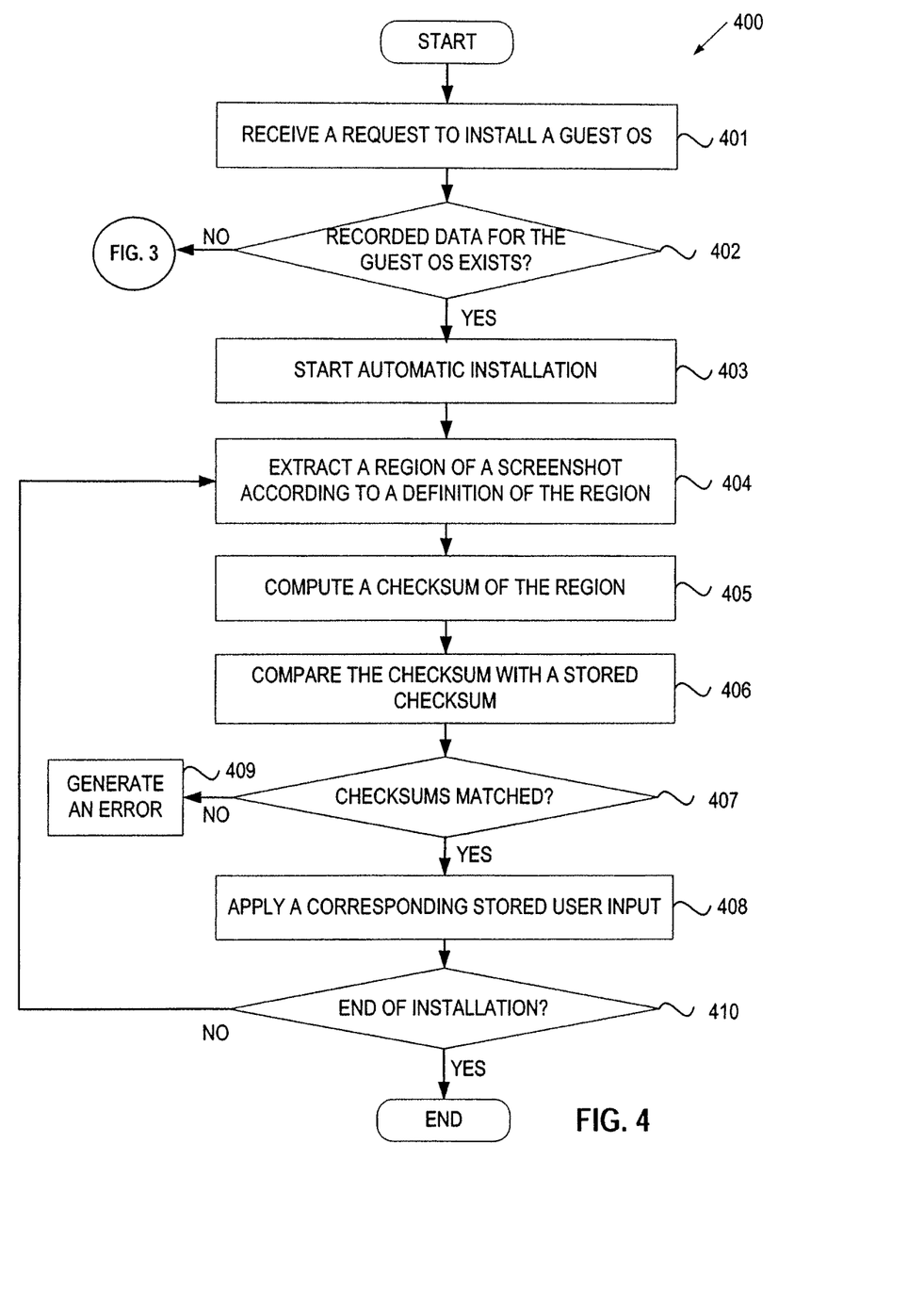
FIG. 4 is a flow diagram illustrating a method for automatically installing a guest operating system, in accordance with one embodiment of the present invention.

If, at block 302, the recorded data for the guest operating system exists on the computer system 101, the installation manager 120 starts an automatic installation as described below with reference to FIG. 4. FIG. 4 is a flow diagram illustrating one embodiment of a method 400 for automatically installing a guest operating system. The method 400 may be performed by processing logic 526 of FIG. 5 that may comprise hardware (e.g., circuitry, dedicated logic, programmable logic, microcode, etc.), software (e.g., instructions on a computer readable storage medium executable by a processing system), or a combination thereof. In one embodiment, the method 400 is performed by the installation manager 120 (FIGS. 1 and 2).

Referring to FIG. 4, the method 400 begins with the installation manager 120 receiving a request to install a guest operating system on a virtual machine run by the computer system 101 of FIG. 1 (block 401). Descriptions relating to blocks 401 and 402 are similar to those relating to blocks 301 and 301, and, therefore, are not repeated herein. If the recorded data exists on the computer system 101 (block 402), the installation manager 120 starts an automatic installation process (block 403). The installation manager 120 intercepts and redirects an image of an input request into an internal buffer, and extracts a region of the screenshot (block 404) according to a definition of the region. The definition of the region is stored in memory; e.g., the region selection memory 220 of FIG. 2. The installation manager 120 then computes the checksum of the pixel values in the region (block 405). The installation manager 120 compares the computed checksum with a stored checksum that corresponds to the same input request and the same guest operating system (block 406). If the two checksums are the same (block 407), the installation manager 120 applies the user input recorded from the manual installation to the input request (block 408). If the two checksums are different (block 407), the installation manager 120 generates an error message (block 409). The installation manager 120 repeats the operations of blocks 404-409 until the end of installation is reached (block 410). The method 400 then terminates.

Figure 5:
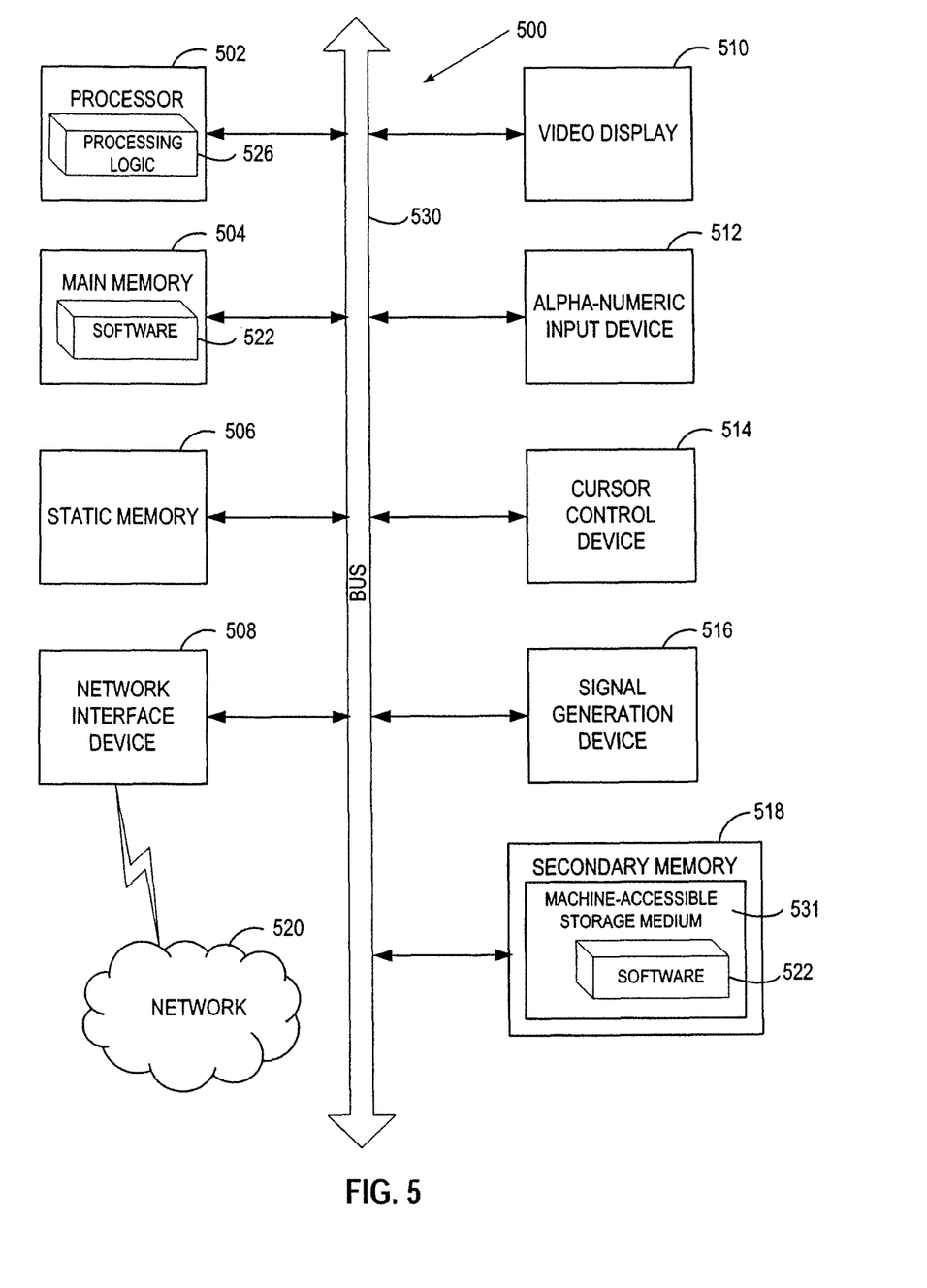
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may include the stored data memory 220 and the region selection memory 230 (FIG. 2). While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
extracting, during a current installation of a guest operating system on a virtual machine hosted by a computer system, a region of an image according to a stored definition of the region;
computing, by the computer system, a checksum of the region of the image that represents a user input request during the current installation of the guest operating system;
obtaining a stored checksum corresponding to the computed checksum, the stored checksum being obtained using manual installation data recorded during a manual installation of the guest operating system, the manual installation data comprising user inputs pertaining to respective user input requests, the manual installation data further comprising stored checksums associated with the respective user input requests;
comparing, by the computer system, the computed checksum with the stored checksum; and
when the computed checksum matches the stored checksum, utilizing, by the computer system, a corresponding user input, recorded during the manual installation of the guest operating system, as a response to the user input request during the current installation of the guest operating system.

2. The method of claim 1, further comprising:
recording, in a file associated with the guest operating system, at least one region selected by a user for each user input request in an input request series for installing the guest operating system.

3. The method of claim 1,
wherein the definition of the region comprises a position on a display screen.

4. The method of claim 1, wherein the region comprises one or more keywords that identify the user input request.

5. The method of claim 1, wherein computing a checksum further comprises:
intercepting and redirecting the image to a file to extract the region.

6. A computer readable storage medium including instructions that, when executed by a computer system, cause the computer system to perform a method comprising:

extracting, during a current installation of a guest operating system on a virtual machine hosted by the computer system, a region of an image according to a stored definition of the region;

computing a checksum of the region of the image that represents a user input request during the current installation of the guest operating system;

obtaining a stored checksum corresponding to the computed checksum, the stored checksum being obtained using manual installation data recorded during a manual installation of the guest operating system, the manual installation data comprising user inputs pertaining to respective user input requests, the manual installation data further comprising stored checksums associated with the respective user input requests;

comparing the computed checksum with the stored checksum; and     when the computed checksum matches the stored checksum, utilizing a corresponding user input, recorded during the manual installation of the guest operating system, as a response to the user input request during the current installation of the guest operating system.

7. The computer readable storage medium of claim 6, wherein the method further comprises:

recording, in a file associated with the guest operating system, at least one region selected by a user for each user input request in an input request series for installing the guest operating system.

8. The computer readable storage medium of claim 6, wherein the definition of the region comprises a position on a display screen.

9. The computer readable storage medium of claim 6, wherein the region comprises one or more keywords that identify the user input request.

10. The computer readable storage medium of claim 6, wherein computing a checksum further comprises:

intercepting and redirecting the image to a file to extract the region.

11. A system comprising:

a memory;

a processor; and an installation manager, executed from the memory by the processor, to extract, during a current installation of a guest operating system on a virtual machine, a region of an image according to a stored definition of the region, to compute a checksum of the region of the image that represents a user input request during the current installation of the guest operating system, and to obtain a stored checksum corresponding to the computed checksum, the stored checksum being obtained using manual installation data recorded during a manual installation of the guest operating system, the manual installation data comprising user inputs pertaining to respective user input requests, the manual installation data further comprising stored checksums associated with the respective user input requests, the installation manager further to compare the computed checksum with the stored checksum, and when the computed checksum matches the stored checksum, to utilize a corresponding user input, recorded during the manual installation of the guest operating system, as a response to the user input request during the current installation of the guest operating system.

12. The system of claim 11, wherein the region comprises one or more keywords that identify the user input request.

13. The system of claim 11, wherein the computer system further comprises:

a recorder module to record, in a file associated with the guest operating system, at least one region selected by a user for each user input request in the input request series.

14. The system of claim 11, wherein the host further comprises:

a region selection module that contains the definition of the region, the definition specific to the guest operating system.

* * * * *